United States Patent
Alesiani et al.

(10) Patent No.: US 10,497,145 B2
(45) Date of Patent: Dec. 3, 2019

(54) SYSTEM AND METHOD FOR REAL-TIME LARGE IMAGE HOMOGRAPHY PROCESSING

(71) Applicant: NEC Europe Ltd., Heidelberg (DE)

(72) Inventors: Francesco Alesiani, Heidelberg (DE); Ankur Singh, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 95 days.

(21) Appl. No.: 15/814,437

(22) Filed: Nov. 16, 2017

(65) Prior Publication Data

US 2019/0147621 A1   May 16, 2019

(51) Int. Cl.
  *G06T 7/80*    (2017.01)
  *G05B 17/02*   (2006.01)
  *G06T 7/50*    (2017.01)

(52) U.S. Cl.
  CPC ............. *G06T 7/80* (2017.01); *G05B 17/02* (2013.01); *G06T 7/50* (2017.01); *G06T 2207/20084* (2013.01); *G06T 2207/30244* (2013.01)

(58) Field of Classification Search
  None
  See application file for complete search history.

(56) References Cited

U.S. PATENT DOCUMENTS

| | | | | |
|---|---|---|---|---|
| 7,272,467 B2* | 9/2007 | Goncalves | ............. | G01C 21/12 700/245 |
| 7,650,013 B2* | 1/2010 | Dietsch | ............. | G06K 9/00664 382/103 |
| 9,456,131 B2 | 9/2016 | Tran | | |
| 2013/0215264 A1* | 8/2013 | Soatto | ............. | G06K 9/4671 348/143 |
| 2014/0126769 A1* | 5/2014 | Reitmayr | ............. | G06T 7/73 382/103 |
| 2015/0287203 A1* | 10/2015 | Baumberg | ............. | H04N 5/232 382/103 |
| 2016/0163022 A1* | 6/2016 | Peleg | ............. | G11B 27/00 382/294 |

(Continued)

OTHER PUBLICATIONS

Tateno, Keisuke, et al. "Cnn-slam: Real-time dense monocular slam with learned depth prediction." Proceedings of the IEEE Conference on Computer Vision and Pattern Recognition. 2017. (Year: 2017).*

(Continued)

*Primary Examiner* — Andrae S Allison
(74) *Attorney, Agent, or Firm* — Leydig, Voit & Mayer, Ltd.

(57) ABSTRACT

A method for image processing performed by a computing device includes: (a) receiving one or more images and preprocessing the one or more images by extracting one or more features from the one or more images; (b) estimating image homographies (and/or fundamental matrices) based on the one or more features extracted from the one or more images; (c) determining particle trajectories based on composition of the image homographies (and/or fundamental matrices), wherein a particle trajectory comprises image pixel points identified in a subset of the one or more images; and (d) determining a joint estimation of camera pose, camera parameters, and a dense depth map using the particle trajectories.

19 Claims, 18 Drawing Sheets

(56) References Cited

U.S. PATENT DOCUMENTS

2016/0350930 A1* 12/2016 Lin .................... G06K 9/66
2018/0349526 A1* 12/2018 Atsmon ............ G06F 17/5009

OTHER PUBLICATIONS

DeTone, Daniel, Tomasz Malisiewicz, and Andrew Rabinovich. "Deep image homography estimation." arXiv preprint arXiv: 1606.03798 (2016). (Year: 2016).*

Milz, Stefan, et al. "Visual slam for automated driving: Exploring the applications of deep learning." Proceedings of the IEEE Conference on Computer Vision and Pattern Recognition Workshops. 2018. (Year: 2018).*

Park, Haesol, and Kyoung Mu Lee. "Joint estimation of camera pose, depth, deblurring, and super-resolution from a blurred image sequence." Proceedings of the IEEE International Conference on Computer Vision. 2017. (Year: 2017).*

Ignacio Rocco, et al., "Convolutional neural network architecture for geometric matching", 2017 IEEE Conference on Computer Vision and Pattern Recognition, Apr. 13, 2017, pp. 1-15.

Daniel DeTone, et al., "Deep Image Homography Estimation", RSS Workshop on Limits and Potentials of Deep Learning in Robotics, Jun. 13, 2016, pp. 1-5.

Kaiming He, et al., "Mask R-CNN", Computer Vision and Pattern Recognition, Apr. 5, 2017, pp. 1-10.

Alex Krizhevsky, et al., "ImageNet Classification with Deep Convolutional Neural Networks", Proceeding NIPS'12 Proceedings of the 25$^{th}$ International Conference on Neural Information Processing Systems—vol. 1, Dec. 3-6, 2012, pp. 1097-1105.

David Held, et al., "Learning to Track at 100 FPS with Deep Regression Networks", European Conference on Computer Vision (ECCV) 2016, Aug. 16, 2016, pp. 1-26.

Jakob Engel, et al., "Direct Sparse Odometry", IEEE Transactions on Pattern Analysis and Machine Intelligence, vol. 40, No. 3, Mar. 2018, pp. 611-625.

Cadena Cesar et al: "Past, Present, and Future of Simultaneous Localization and Mapping: Toward the Robust-Perception Age", IEEE Transactions on Robotics, IEEE Service, NJ, US, vol. 32, No. 6, Dec. 1, 2016 (Dec. 1, 2016), pp. 1309-1332, XP011635721.

Daniel Detone et al: "Deep Image Homography Estimation", Jun. 12, 2016 (Jun. 12, 2016), XP055554930.

Daniel Detone et al: "Toward Geometric Deep SLAM", Jul. 24, 2017 (Jul. 24, 2017), XP055554935.

Sudheendra Vijayanarasimhan et al: "SfM-Net: Learning of Structure and Motion from Video", Apr. 25, 2017 (Apr. 25, 2017), XP055554941.

Sen Wang et al: "DeepVO: Towards end-to-end visual odometry with deep Recurrent Convolutional Neural Networks", 2017 IEEE International Conference on Robotics and Automation (ICRA), May 1, 2017 (May 1, 2017), pp. 2043-2050, XP055554939.

* cited by examiner

NN used for each hypothesis

SYSTEM AND METHOD FOR REAL-TIME LARGE IMAGE HOMOGRAPHY PROCESSING

BACKGROUND

Perception is a process of understanding an environment where a robot moves about. An example of an application where perception is used is with autonomous driving (AD) cars. AD vehicles may need to understand the environment, which may include one or more obstacles, driving lanes, driving rules pertaining to a specific location, etc., in order to freely move around. AD vehicles may also need to understand the environment in order to classify different obstacles encountered, for example, a pedestrian, a bicycle, etc., for prediction and high level reasoning.

Conventional methods use either engineered features or small convolutional networks to address the problem of perception. Convolutional neutral networks (CNNs) and in general artificial neural networks (NNs) provide conventional performance in almost all image processing tasks. They compute features directly from data, but are limited to small image patches. Mask R-CNN has been used to show the potential of application of NNs to larger images, but it has only been applied for image classification and detection.

SUMMARY

In an exemplary embodiment, the present invention provides a method for image processing performed by a computing device. The method includes: (a) receiving one or more images and preprocessing the one or more images by extracting one or more features from the one or more images; (b) estimating image homographies and/or fundamental matrices based on the one or more features extracted from the one or more images; (c) determining particle trajectories based on composition of the image homographies and/or fundamental matrices, wherein a particle trajectory comprises image pixel points identified in a subset of the one or more images; and (d) determining a joint estimation of camera pose, camera parameters, and a dense depth map using the particle trajectories.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention address the problem of real-time performance of visual-based motion control for robots, drones, vehicles and similar automated mobile entities. The embodiments provide a general method of performing homography (or local transformation, as for example, defined by a fundamental matrix) computation in real-time. The homography computation is executed on a common feature map thereby avoiding feature computation for each hypothesis. The invention also includes embodiments that utilize neural networks to perform the homography computation in order to improve dense depth estimation, object tracking, and object classification, thus allowing for example estimation of object distance and its variations.

In another exemplary embodiment, the present invention provides an image processor comprising a convolutional neural network and a task-specific head convolutional network. The convolutional neural network is configured to: receive one or more images and preprocess the one or more images by extracting one or more features from the one or more images. The task-specific head convolutional neural network is configured to estimate an image homography based on the one or more features extracted from the one or more images, determine particle trajectory based on composition of the image homography, wherein the particle trajectory comprises image pixel points identified in a subset of the one or more images, and determine a joint estimation of camera pose, camera parameters, and a dense depth map using the particle trajectory.

Embodiments of the invention use video image (or a sequence of images) to achieve perception. Video image is typically processed to identify clues or features, and then the identified clues or features are used for image homography and/or image re-identification. Segmentation is applied separately to classify objects, while optical flow can be used for segmentation and object movement estimation. In conventional systems, these methods usually involve computation per image, which are rarely used on different tasks since the features extracted are typically engineered for the specific task.

Exemplary embodiments of the invention provide a method that applies neural networks (NNs) and in particular convolutional neural networks (CNN) to processing of large image for homography, dense depth estimation, and object tracking, thus allowing the use of CNN for real-time visual perception and simultaneous localization and mapping.

Figure 1:
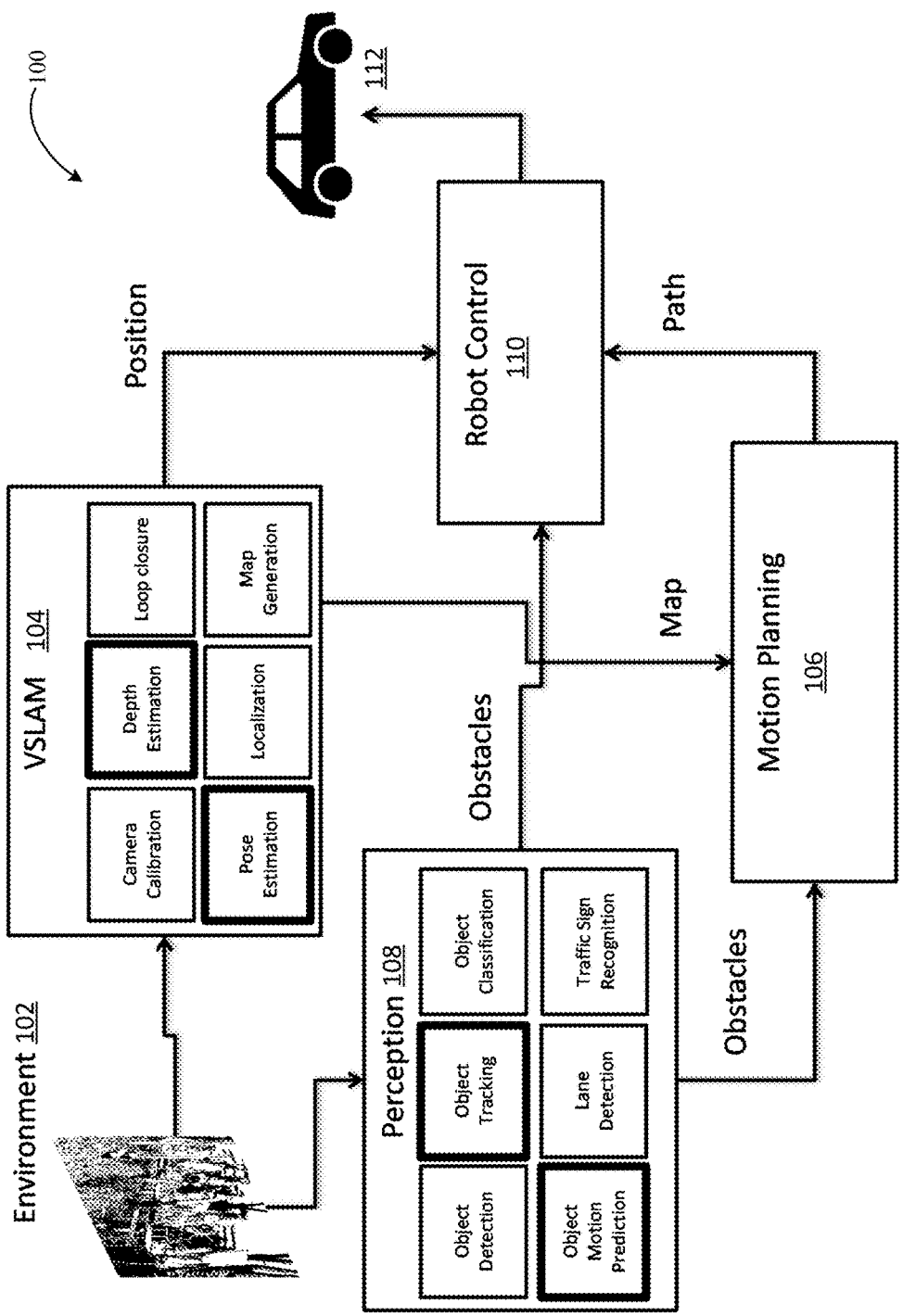
FIG. 1 illustrates a system level diagram for visual based motion control according to some embodiments of the invention.

FIG. 1 illustrates a system level diagram for visual-based motion control according to some embodiments of the invention. The visual-based motion control system 100 is an example control system that may be used by a robot. The robot may receive visual information or visual inputs for use in understanding of its surroundings (or environment 102) and its position and then to determine control commands to navigate within its surroundings. The robot may include various blocks and modules to make sense of its environmental inputs and generate actuated outputs. In FIG. 1, the visual simultaneous localization and mapping (VSLAM) module 104, the perception module 108, the motion planning module 106, and the robot control module 110 are identified. The VSLAM module 104 computes the current position of the robot in the environment 102 and updates the map of the environment 102. The map information is used by the motion planning module 106 to define a path of the robot. The perception module 108 detects and tracks obstacles encountered in the environment 102. The robot control module 110 defines detailed control commands for the robot based on its current state (e.g., its position), the environmental state (e.g., obstacles), and the plan (e.g., the path of the robot). FIG. 1 shows that the robot control module 110 provides the control commands to the robot actuators (represented as item 112 in FIG. 1).

In FIG. 1, the VSLAM module 104 may include camera calibration, depth estimation, loop closure, pose estimate, localization, and map generation components. Also in FIG. 1, the perception module 108 may include object detection, object tracking, object classification, object motion prediction, lane detection, and traffic sign recognition components. Depth estimation and pose estimation of the VSLAM module 104 and object tracking and object motion prediction of the perception module 108 are highlighted as examples of components that may benefit from some embodiments of the invention, as depicted in FIG. 2.

Figure 2:
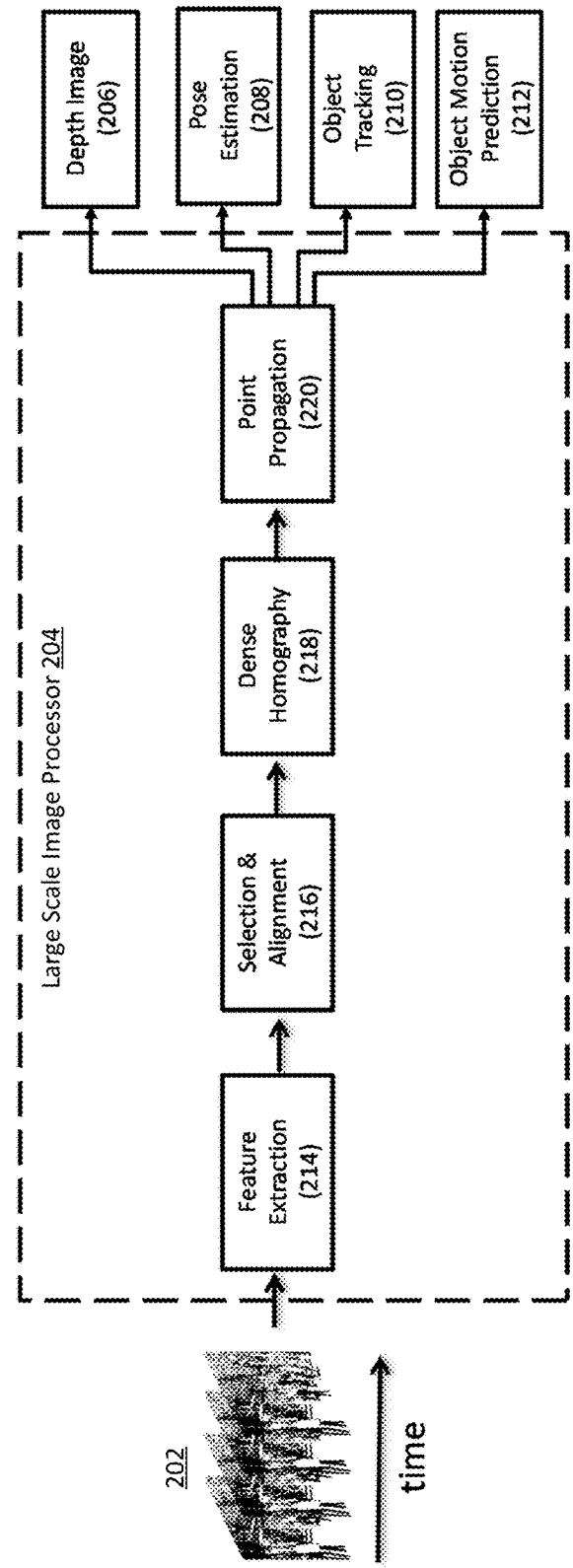
FIG. 2 illustrates a large scale image processor with sample inputs and outputs according to some embodiments of the invention.

FIG. 2 illustrates a large scale image processor 204 with sample inputs and outputs according to some embodiments of the invention. The inputs 202 to the large scale image processor 204 may be a video image (or a sequence of images), and the outputs to the large scale image processor 204 may be a depth image 206, a pose estimation 208, object tracking 210, and object motion prediction 212. The large scale image processor 204 may include one or more components to perform the functions of feature extraction 214, selection and alignment 216, dense homography 218, and point propagation 220. The large scale image processor 204 obtains inputs 202 which may include one or more images and derives a dense homography that is then used to obtain the depth image 206 (or dense depth map), the pose estimation 208, the object tracking 210, and the object motion prediction 212.

Homography (or fundamental matrix relationship) is the affine (general projective transformation) transformation between two images. Homography considers the scene as planar (as for images on flat surfaces or infinite focus), while fundamental matrix is the relationship between images of the same object at displaced images. Homography is usually characterized by a linear relationship between image projected coordinates of same points in the real world (Hx=y, where x represents coordinates on a first image of a world point, y represents coordinates on a second image of the same world point, and H represents the homography matrix). Fundamental matrix generates a projective relationship (xFy=0, where F is the fundamental matrix). Both the homography matrix and the fundamental matrix relationships can be derived by the transformation of corresponding pixel between two images, by using 4 points for homography and 8 points for fundamental matrix. This property is used in the learning phase and in the propagation phase. It will be appreciated that although the exemplary embodiments of the invention provide examples with respect to using a homography, these exemplary embodiments of the invention may apply to using either a homography or a fundamental matrix.

Figure 3:
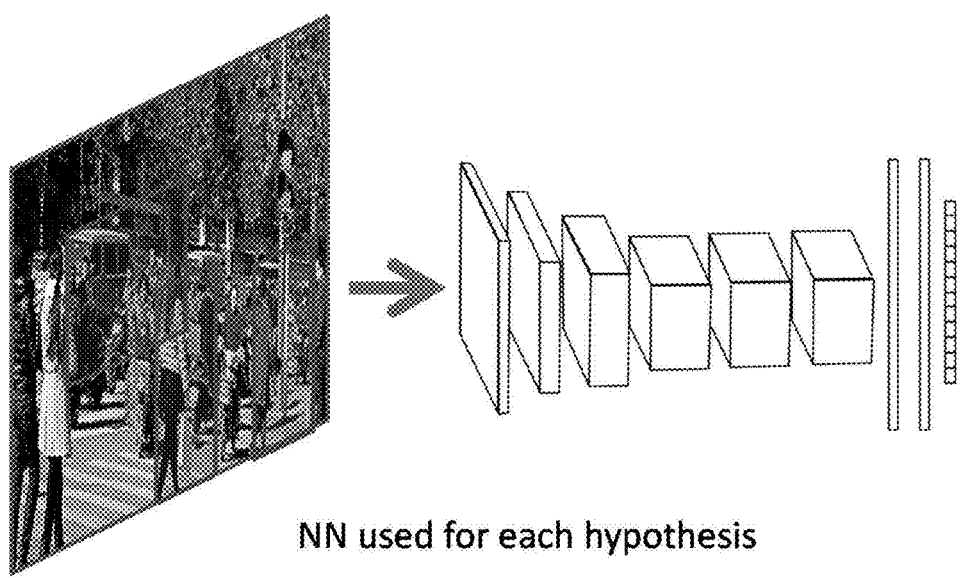
FIG. 3 illustrates a traditional neural network chain.

FIG. 3 illustrates a traditional neural network chain where hypotheses identified in an image are fed through a neural network chain. In a traditional manner, the neural network chain performs computation for each hypothesis in the image.

Figure 4:
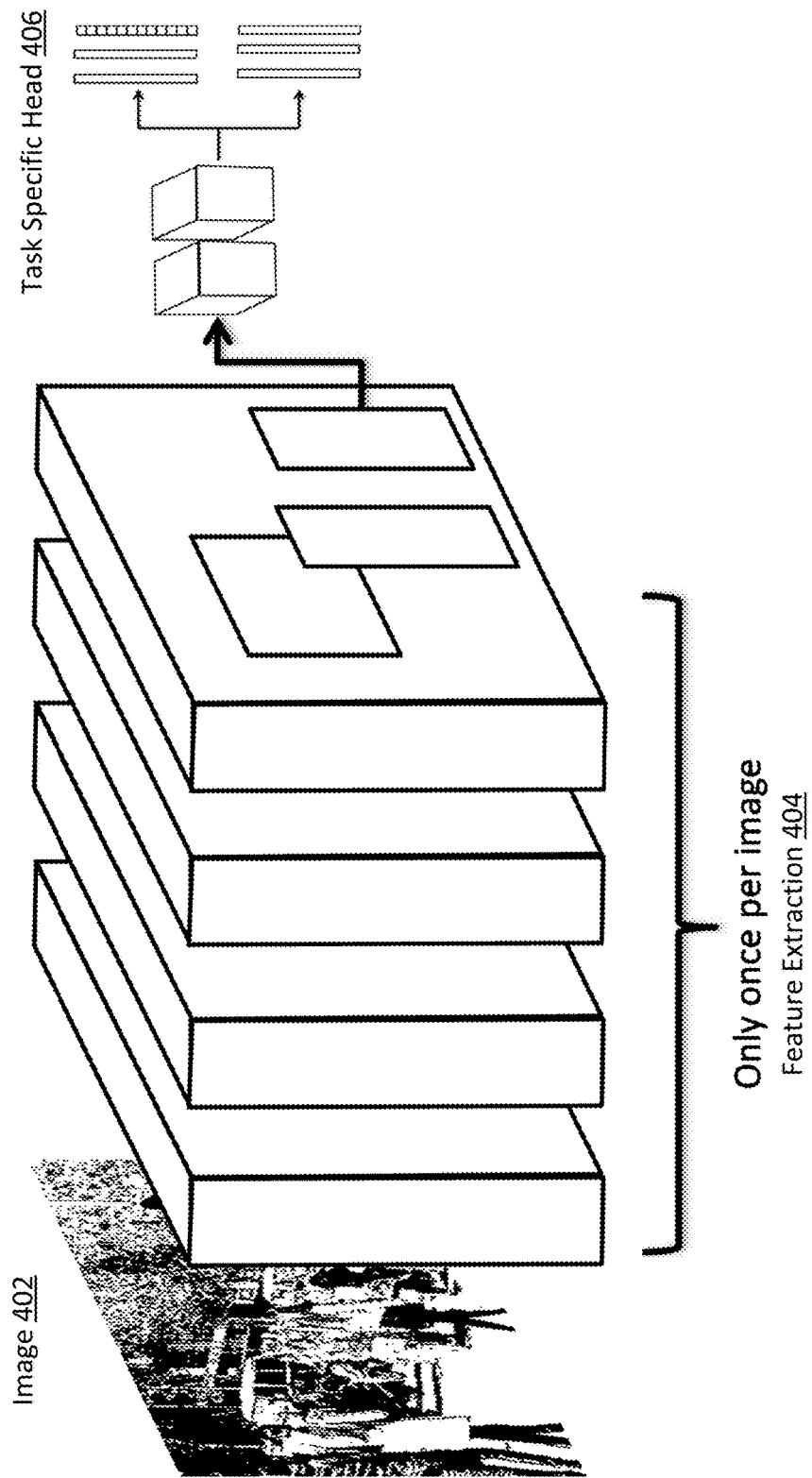
FIG. 4 illustrates a shared neural network architecture for feature extraction according to some embodiments of the invention.

FIG. 4 illustrates a shared neural network architecture for preprocessing and feature extraction according to some embodiments of the invention. The shared neural network architecture allows for a computation of a common feature map on an image 402 that is then shared for different tasks and different time instants. The shared NN can extract features at different scales (or different levels of zoom), and as such, can support processing of different aspects of the image at different scales. In this context, a feature is a multidimensional array (or a "tensor" in mathematical terms). A feature is characterized by its dimension, location and the chain of layer that generated it.

Embodiments of the invention may use the features of a sequence of images to derive information, such as local homography, object classification and masking, on different hypotheses. A hypothesis refers to a selection of the feature of the whole image. When, for example, there are two images, a hypothesis is the combination of a sub-feature (or local feature) of the first image with another one from the second image, where the two features may have different locations (i.e., different positions) in each of the images.

Embodiments of the invention evaluate different hypotheses on the feature map during feature extraction 404 of the image 402, thus reducing computation time when computing homography for each patch, area, or region in the original images. The reduction of complexity is because the full feature is not considered. An image feature is split into smaller features and then mapped to the task-specific head 406 (for example, a 6×6×1024 is the input of the task specific head 406 instead of the W×H×1024 of the original feature, where W,H>>6). This is graphically depicted in FIG. 5.

Figure 5:
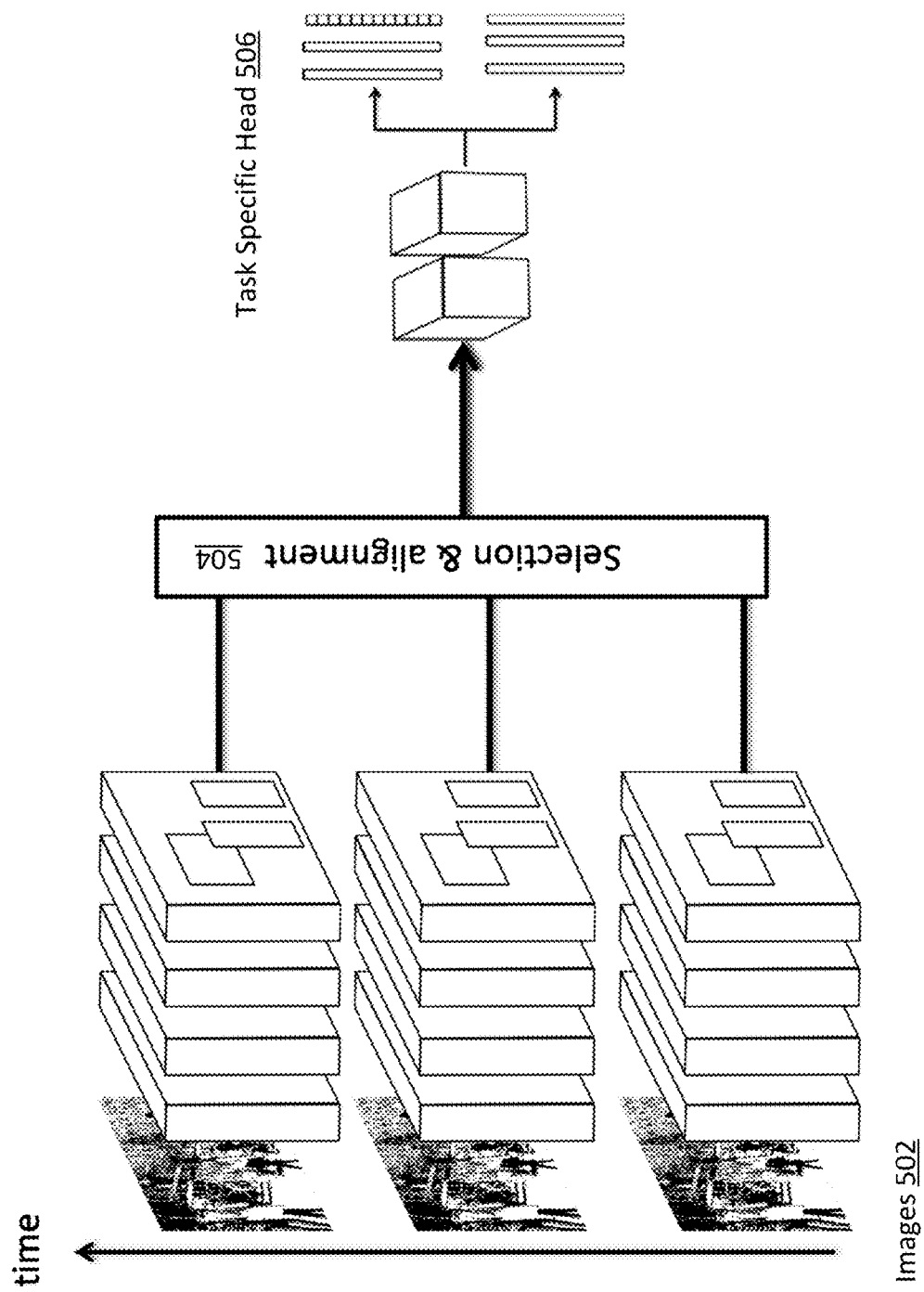
FIG. 5 illustrates an example of feature pre-processing for an image sequence according to some embodiments of the invention.

FIG. 5 illustrates an example of feature pre-processing for an image sequence 502 according to some embodiments of the invention. A series of images are fed to a shared NN architecture over time. The shared NN architecture extracts features of each image. A selection and alignment module 504 selects features extracted from the shared NN architecture and aligns these features and provides them to a task-specific head 506 for further processing. The selection and alignment module 504 implements a mapping between a sub-feature of some size (e.g., 14×14×1024) to a destination input tensor (e.g., 6×6×1024). Methods, such as RoI-Pooling or RoIAlign may be used to realize the selection and alignment module 504. In some cases, functions of the selection and alignment module 504 may be realized with a resample method based on a 2D binomial interpolation that can be applied to each channel (e.g., each of the 14×14 matrix goes into a 6×6 matrix). In this manner, the task-specific head 506 performs hypothesis testing on features extracted from the shared NN, where each image in the image sequence 502 goes through the feature extraction process once. The task-specific head 506 may compute homography of a scene portrayed by the image sequence 502 at local and global levels. The task-specific head 506 may track a specific area within the image sequence 502 consistent with homography sections. The task-specific head 506 may further provide an indicator of the correspondence or quality of homography estimation. The quality indicator may be learned using a negative sample, i.e., generating a small overlapping area from a synthetic sample that accounts for the negative sample. The quality indicator may use ORB/SIFT indicators, i.e., checking to see if there is enough correspondence. The quality indicator may be determined by perturbing the NN implementing the task-specific head 506 by random dropping/boosting and evaluating the variance of the homography output.

A synthetic sample is an input image (a second image) which is generated from a first image using a pre-defined homography transformation. This transformation is drawn randomly, but it is limited in amplitude (i.e., the image is not stretched too much). The homography transformation becomes the output, and the transformed image becomes the second input.

Random dropping is a method that removes some connection (or simply zeros some feature) in a random way while the neural network is being used. For example, with probability 0.5, a connection of the NN is removed. The process is repeated over some iteration on a specific input. The output of the NN is always different due to the dropping. The mean and the variance of the output provides information of the confidence of the network around the specific input. Random boosting is similar, but it includes generating new samples. It further involves removing and substituting the samples and then evaluating the statistics. Dropping acts on the NN while boosting acts on the samples.

In the embodiments, a shared NN is utilized for all images. The shared NN is common to different tasks since the shared NN receives an image input and produces a set of features from the image input. Each image provided to the shared NN produces one or more features. Each feature may be utilized to test one or more hypotheses. In some embodiments, the hypotheses are tested using convolution or a fully connected NN corresponding to the task-specific head. In some embodiments, the hypotheses are discovered using clustering algorithms over feature maps in the shared NN, and once discovered, the hypotheses are fed into a fully connected NN for different tasks, for example, homography and tracking.

Figure 6:
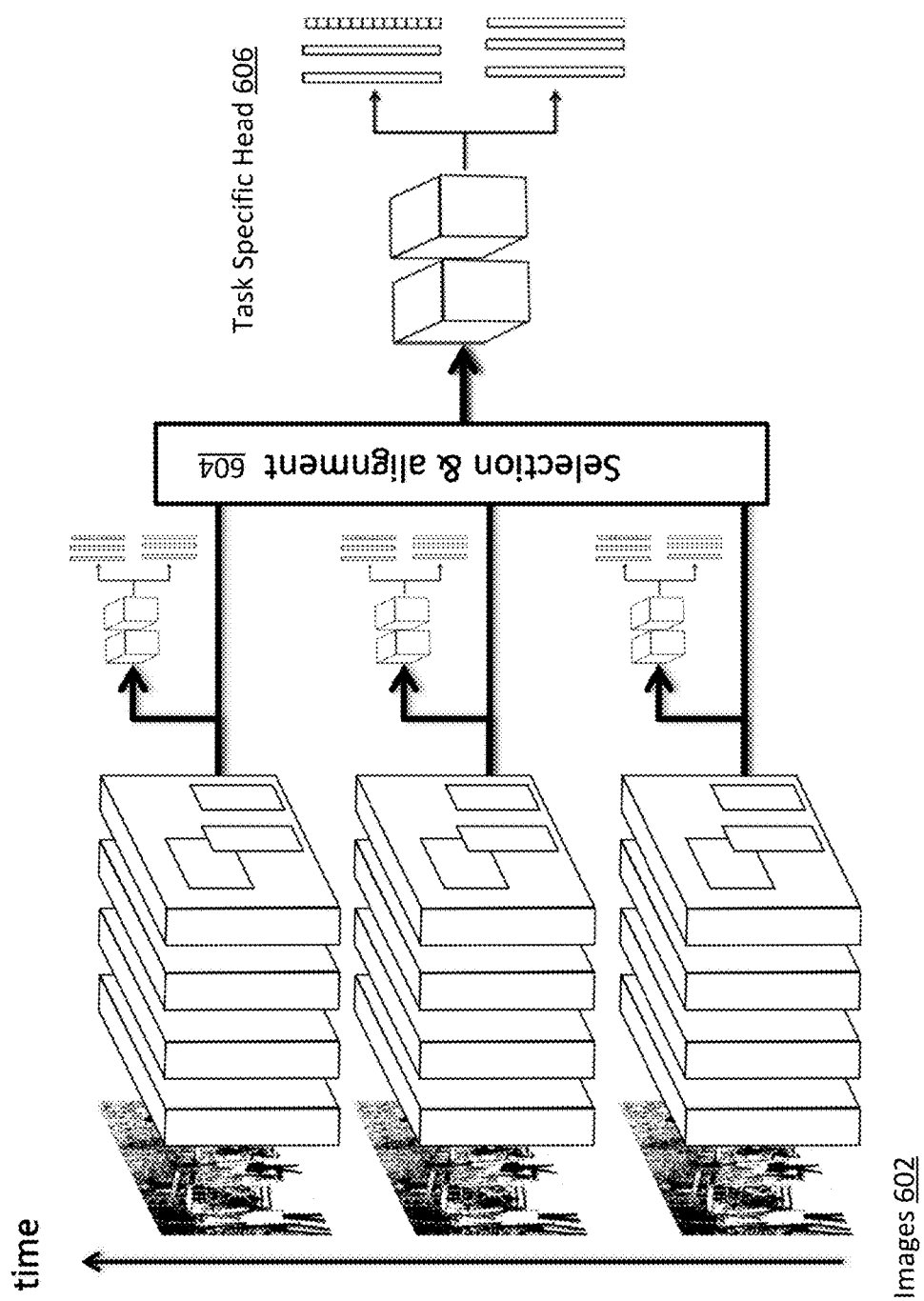
FIG. 6 illustrates an architecture for a combined single image and multiple image processing according to some embodiments of the invention.

FIG. 6 illustrates an architecture for a combined single image and multiple image processing according to some embodiments of the invention. A series of images are fed to a shared NN architecture over time. The shared NN architecture extracts features of each image. A selection and alignment module 604 selects features extracted from the shared NN architecture and aligns these features and provides them to a task-specific head 606 for further processing.

In parallel, features extracted by a single image may be processed by a task-specific head that does not require inputs from multiple images.

Embodiments of the invention use task-specific head networks to perform homography estimation. The task-specific head network, for example, the task-specific head 506 takes as input two (or more) feature maps and derives local homography. The size of the input may be fixed and an adaptation and selection layer, for example, the selection and alignment module 504, prepares the input data for the task-specific head network. The local homography derived by the task-specific head network is derived for different hypotheses and may also include an indicator of quality or a hypothesis flag. The hypothesis flag may be implemented with a softmax output, thereby evaluating as 1 if the hypothesis is consistent, evaluating as 0 if the hypothesis is not consistent, or in general providing the probability that the homography is consistent. The hypothesis flag may be used to rank the homography per pixel. The homography is parametrized by the transformation of the four (eight) points of the original patch. The homography is determined by a regression network, where the last layer has a linear activation function. The loss function for the softmax can be cross entropy while the regression network can use the mean square error norm. A selection mask can be added as output of the homography estimation. The mask selects the part of the input patch image for which the homography applies.

Figure 7:
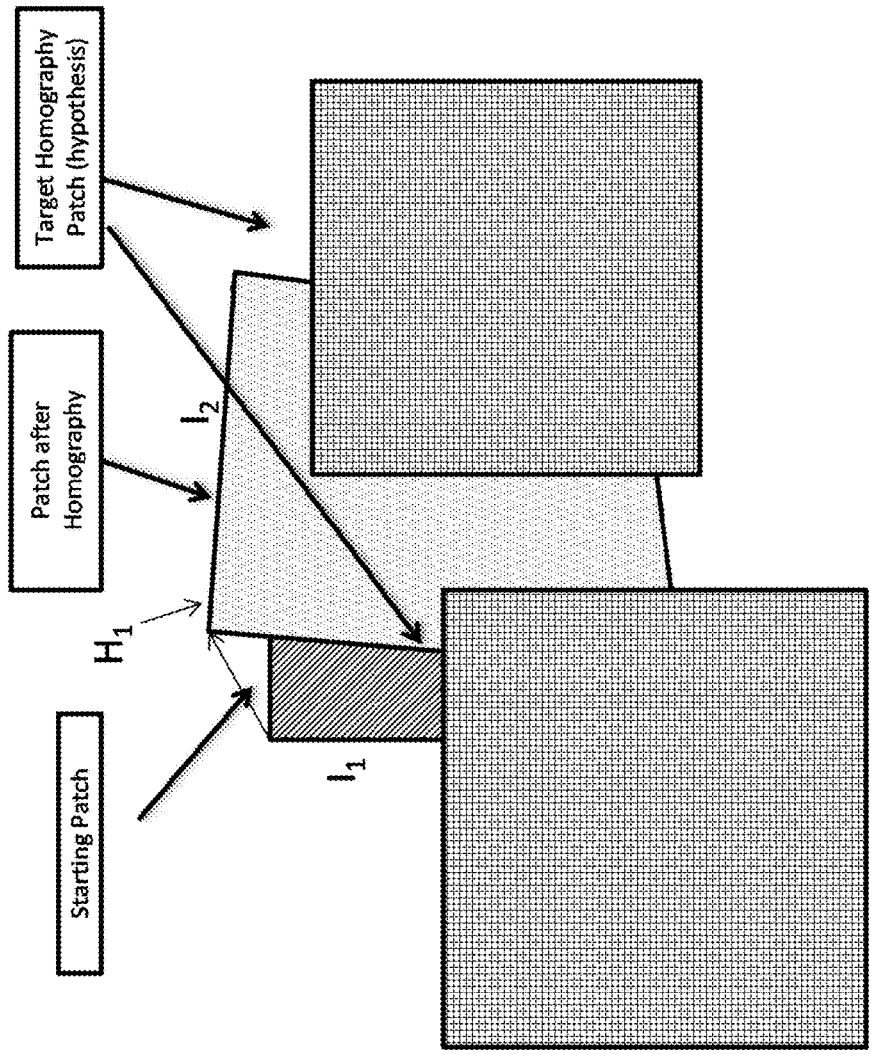
FIG. 7 illustrates multi-hypotheses homography computation according to some embodiments of the invention.

FIG. 7 illustrates an example of multi-hypotheses homography computation according to some embodiments of the invention. In FIG. 7, multiple hypotheses may be tested using the same starting patch. Here, a patch is used to describe a sub-feature, while a hypothesis (for two input images) describes a set of two patches, one for each image. The two patches can come from a sub-feature extracted at a first location in one of the two input images and extracted at a second location in the other of the two input images.

Figure 8:
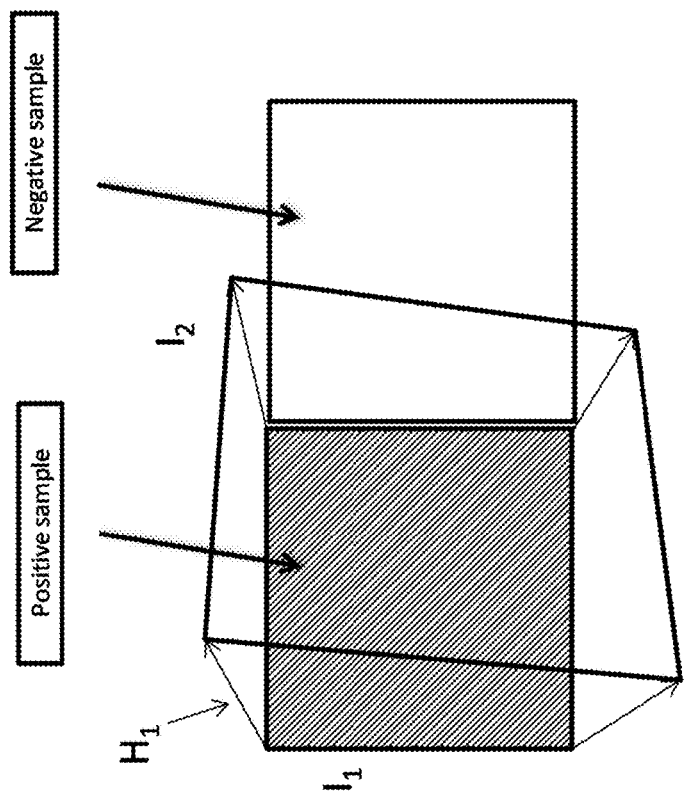
FIG. 8 illustrates generation of positive and negative samples by random homography according to some embodiments of the invention.
Figure 8:
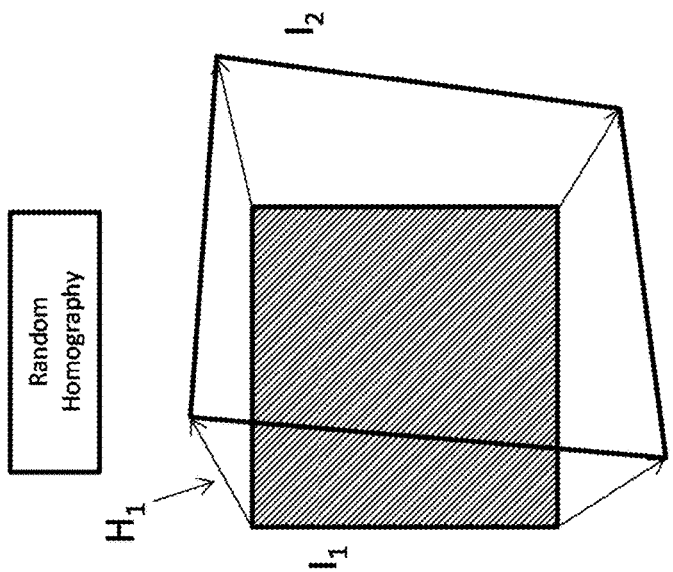

FIG. 8 illustrates generation of positive and negative samples by random homography according to some embodiments of the invention. Feature map learning can be separate or combined with the task (or homography) estimation. The feature map (part of the shared NN that extracts features) can be implemented by an existing pre-trained CNN. For example, the feature map can be implemented by the convolutional layers of ResNet, ResNext, AlexNet, and VGG16. The homography estimation task can be learned on the extracted feature separately and the full network further optimized. The task-specific head can learn homography using positive and negative samples derived by synthetic data, where random homography is applied to images. The four points that define a bounding box are randomly perturbed and generate a local homography. The transformed image is then used for generating the target (positive) patch. Negative patches can be generated by weakly overlapping images (for example, less than 30% IoU (Intersection over union)).

Figure 9:
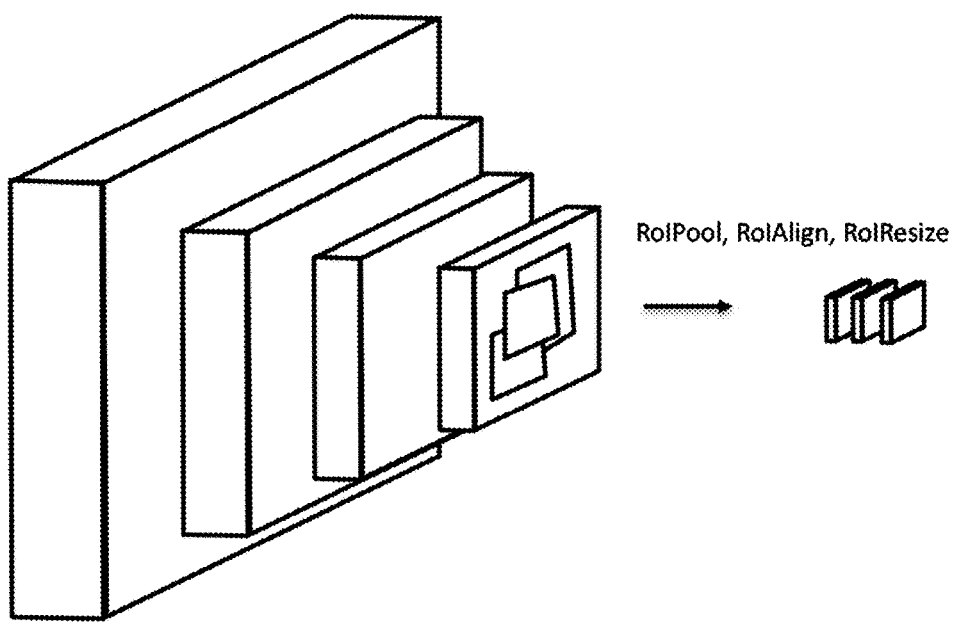
FIG. 9 illustrates a feature pyramid network according to some embodiments of the invention.
Figure 10:
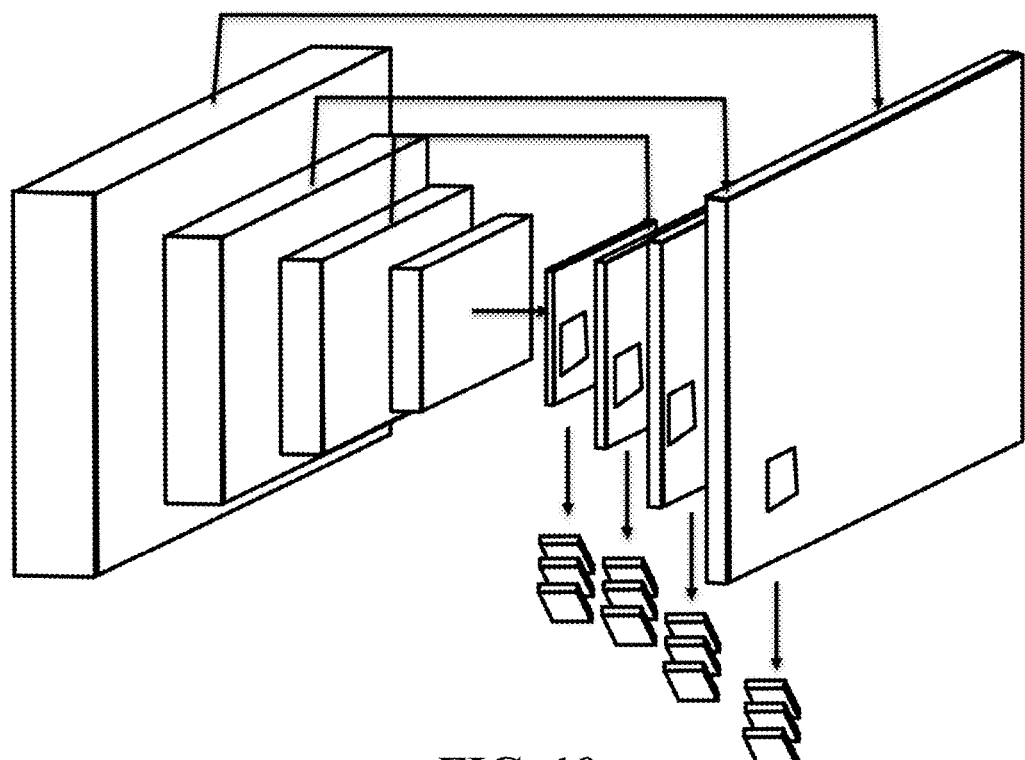
FIG. 10 illustrates a feature pyramid network for multi-scale processing according to some embodiments of the invention.

Feature map learning and homography estimation can work on only the last layer or on different scale layers of a convolutional neural network. FIG. 9 illustrates using only the last feature map for processing. FIG. 9 shows different algorithms that may be used at one or more regions of interest (RoI). These algorithms may include RoIPool, RoIAlign, and RoIResize. FIG. 10 illustrates a feature pyramid network (FPN) for multi-scale processing according to some embodiments of the invention. The FPN may be used for work on different scales. Each scale provides homography at a different level of detail. Each level of the FPN is used to reconstruct an extracted feature at different scale levels. The FPN in FIG. 10 generates a hallucinated feature to different scales which includes all feature information. The task NN may be similarly layered as the FPN, and in that case, the training is different, because the input to the task NN comes from the different levels of the FPN.

Figure 11:
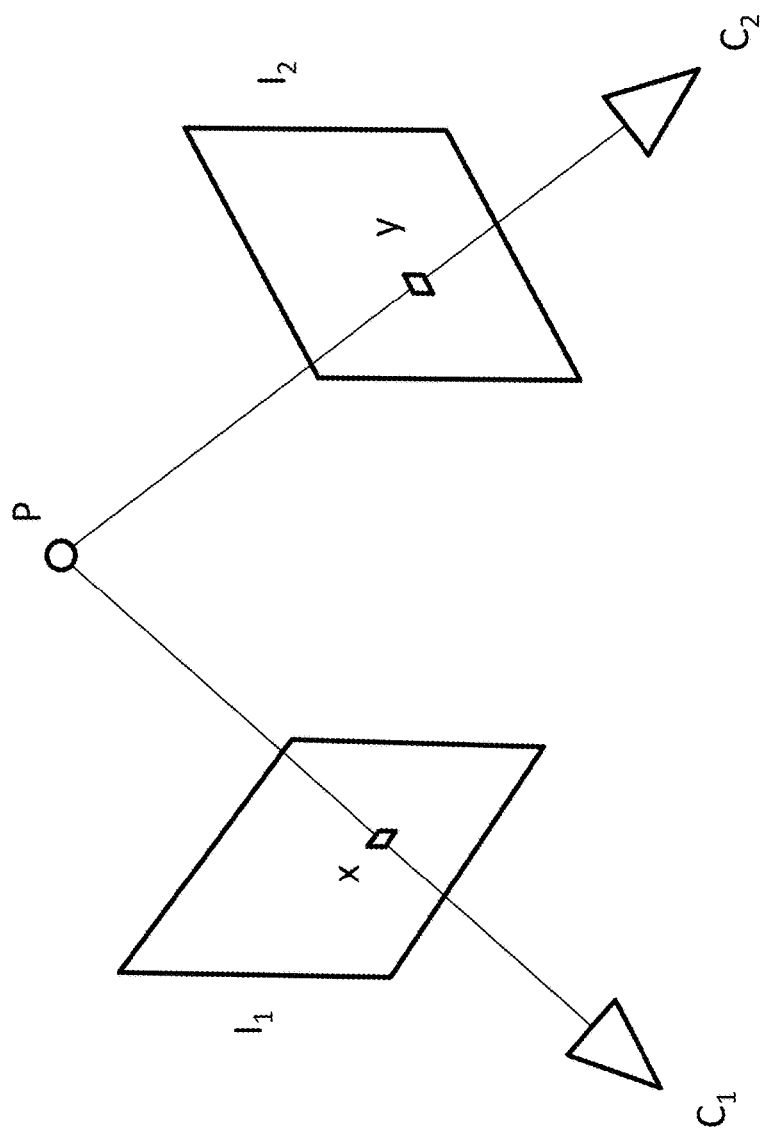
FIG. 11 illustrates a joint pose estimation according to some embodiments of the invention.

The problem of estimating camera pose (angle, translation), intrinsic parameters (focal length) and point position is called Bundle Adjustment. Embodiments of the invention may provide a joint reconstruction of pose, camera parameter and depth map using the local homography estimation. For this calculation, a dense set of particles (image pixel points) are sampled at random according to some distribution. The distribution can be guided by the image classification or other information. The particles are then propagated backwards or forward using the local homography to obtain a trajectory of particles. Backwards and forward propagation are with respect to the sequence of images in time. The trajectory of the particles is then used to compute the solution to Bundle Adjustment. Each point in an image is assumed to correspond to a real world point, i.e., each point exists in 3 dimensions. The camera parameters are 10 in total (3 rotational, 3 translation, and 4 camera intrinsic parameters). If the number of points per image that propagate backward or forward is M, then there are 3M+6K+4 equations (total unknowns), where K is the number of images. This can be obtained with K>3 consecutive images and M>=6K+4. M is the number of points present in all the K images. FIG. 11 illustrates a joint pose, camera parameter, and point coordinate estimation according to some embodiments of the invention.

In more general terms, the equation is 3M+6K+Nc, where Nc is the number of intrinsic parameters of the camera, K is the number of images considered, and M is the number of points present in all the K images.

The intrinsic camera parameters are typically: (cx,cy) which describe the optical center (or principal point) in pixels; (fx,fy) which describe the focal length in pixels in the two axes; and optionally s, the skew coefficient, which is non-zero when the image axes are not perpendicular to each other. Additionally, further considerations may be accounted for, for example, if the camera also has distortion, then the number of parameters grows. Some models consider 5 additional parameters: (k1,k2,k3), which describe radial distortion coefficients of the camera lens, and (p1,p2) which describe tangential distortion coefficients of the camera lens.

Figure 12:
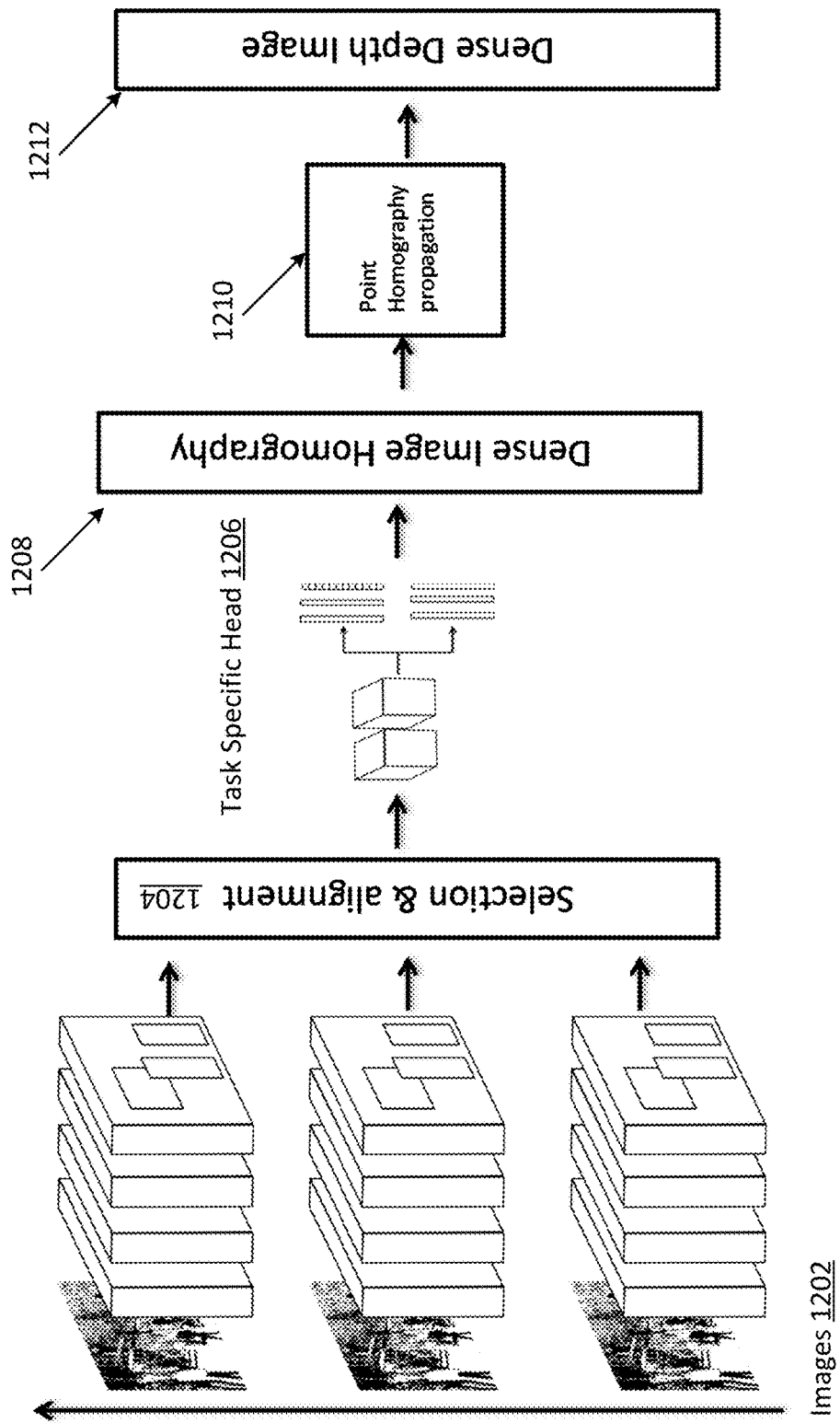
FIG. 12 illustrates an architecture for dense depth map estimation according to some embodiments of the invention.

FIG. 12 illustrates an architecture for dense depth map estimation according to some embodiments of the invention. In FIG. 12, the task-specific head 1206 determines dense image homography 1208. The dense image homography 1208 is utilized in a point homography propagation module 1210 to create the dense depth image 1212. The task-specific head 1206 performs local homography (or fundamental matrix) while the point homography propagation module 1210 derives the trajectories of the particles and thus derives the parameters and the location of the particles using the bundle adjustment algorithm. For a K-image dense depth map where K>3 and M>10 with 6 intrinsic camera parameters known, a set of non-linear equations may be solved to find: (a) point global coordinates up to a scaling factor; and (b) coordinate and intrinsic camera parameters of the camera (6 parameters for external position/rotation and 4 parameters of the camera). A Bundle Adjustment may be solved with each point being associated with depth information. The dense depth image provides an advantage of dense depth estimation for an entire image as opposed to dense depth estimation for a few feature points. In some embodiments, a mask may be utilized to assign each pixel to a specific homography. The dense depth map contains the position of all pixels propagated in the homography chain. That is, the depth map is not limited to only the points with the feature detection description (like SIFT, ORB). The features extracted are only used to derive homography. The depth map comes from the composition of the homographies of the consecutive images.

Figure 13:
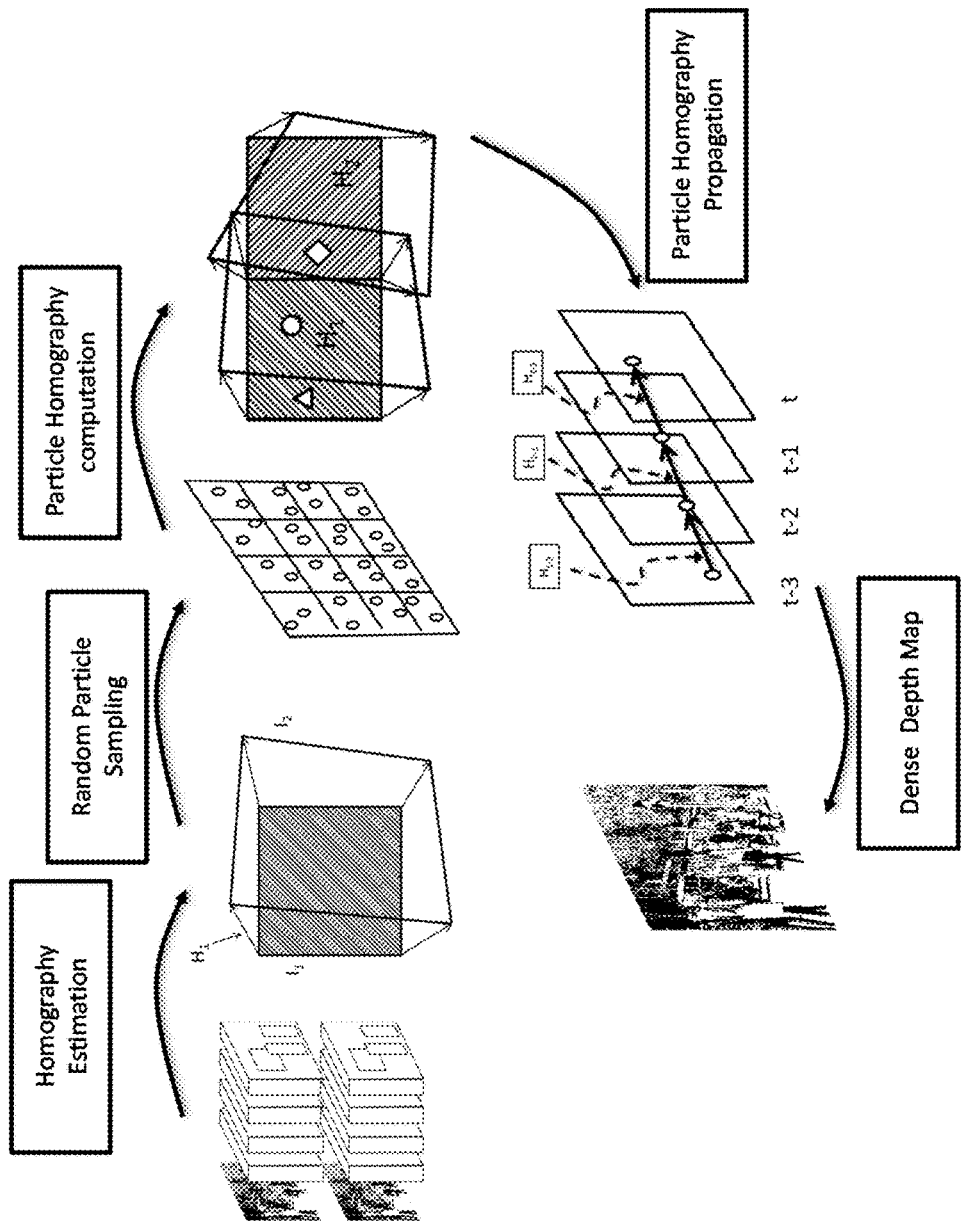
FIG. 13 illustrates a process for dense depth map estimation according to some embodiments of the invention.

FIG. 13 illustrates a process for dense depth map estimation according to some embodiments of the invention. In a first step, homography is estimated from a sequence of images. In a second step, random particle sampling is performed. In a third step, particle homography computation is performed. In a fourth step, particle homography propagation is performed, and in a fifth step, the dense depth map estimation is obtained from the particle homography propagation.

Figure 14:
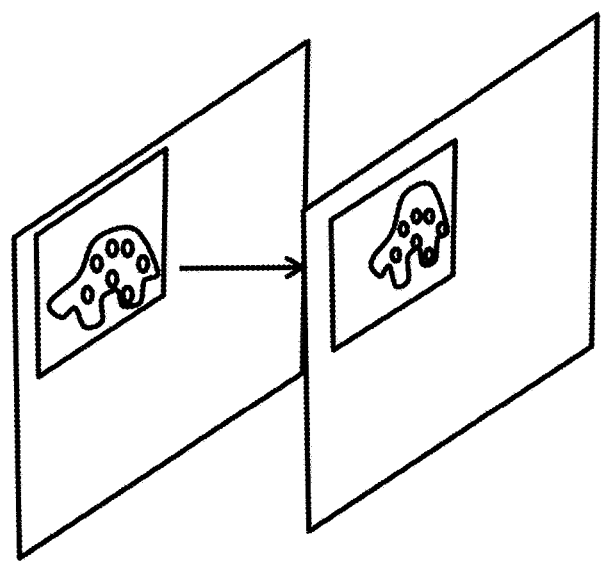
FIG. 14 illustrates an example of forward particle propagation for object tracking according to some embodiments of the invention.

Embodiments of the invention may be used in object tracking and/or object detection. FIG. 14 illustrates an example of forward particle propagation for object tracking according to some embodiments of the invention. In FIG. 14, an object in a previous image is at a different location in a current image. The process illustrated in FIG. 13 can be used to detect one or more objects and/or track one or more objects. Particles trajectories (derived by propagation or homography composition) can be clustered hierarchically to detect hypothesis of object that can be used to speed up object detection. Examples of clustering algorithms that may be used include DBSCAN (density-based spatial clustering of applications with noise) and k-means clustering. Hierarchical clustering indicates that the resulting cluster is refined from higher level clusters, forming a tree structure.

Figure 15:
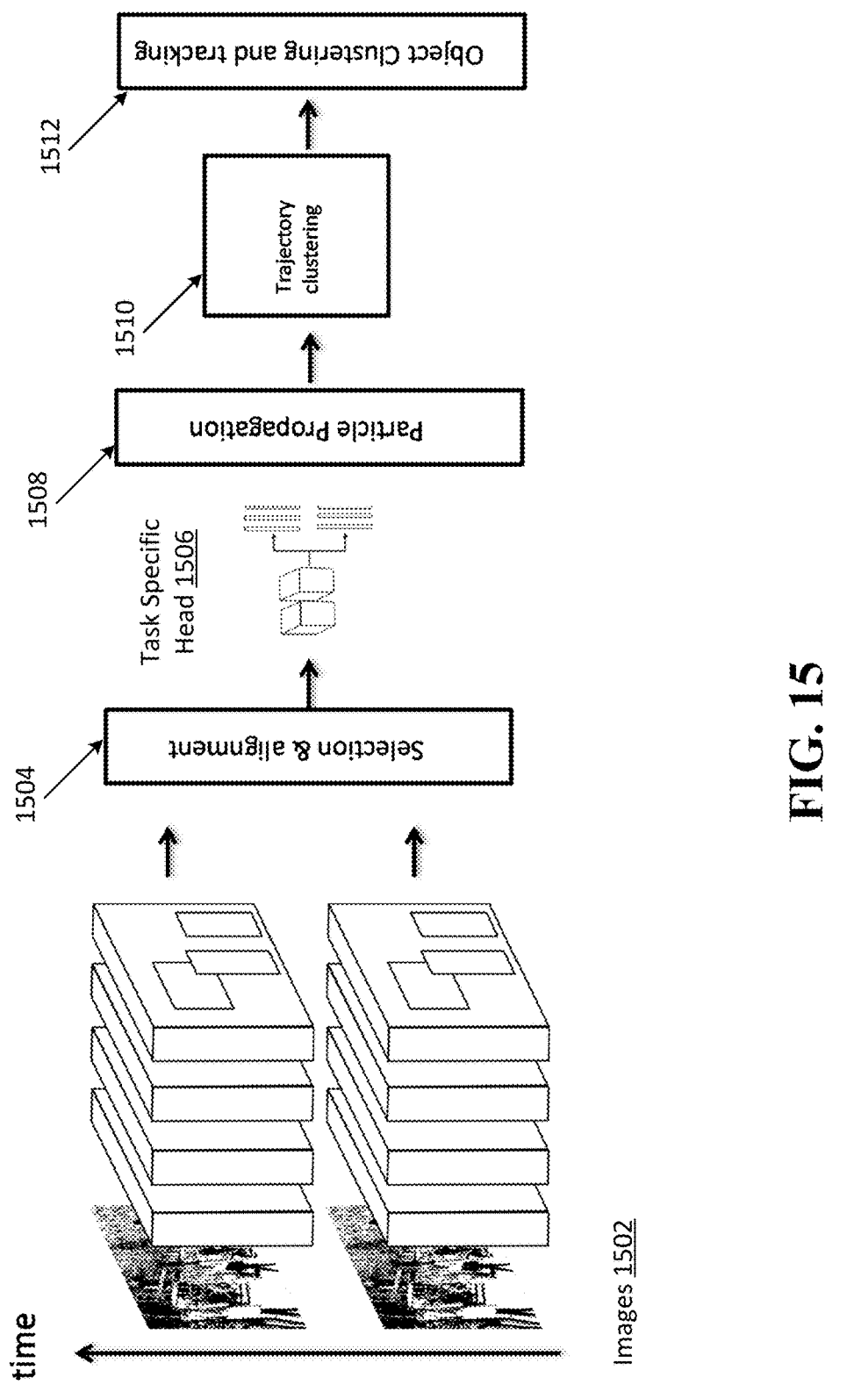
FIG. 15 illustrates an architecture for object tracking and detection according to some embodiments of the invention.

FIG. 15 illustrates an architecture for object tracking and detection according to some embodiments of the invention. The task-specific head 1506 provides homography or particle propagation 1508. The particle propagation 1508 is then clustered in a particle trajectory module 1510 and the clustered particle propagation is used to detect hypotheses of one or more objects. In FIG. 15, after generating particle trajectories, the particle trajectories are clustered and grouped, thus enabling tracking of the full object estimated. The rule that particles that belong to the same object will move with the object is used to distinguish objects. So when particles trajectories suggest that one or more particles move together, then the architecture in FIG. 15 determines that the particles likely belong to the same object. In some cases, the architecture tracks objects that propagate together.

Figure 16:
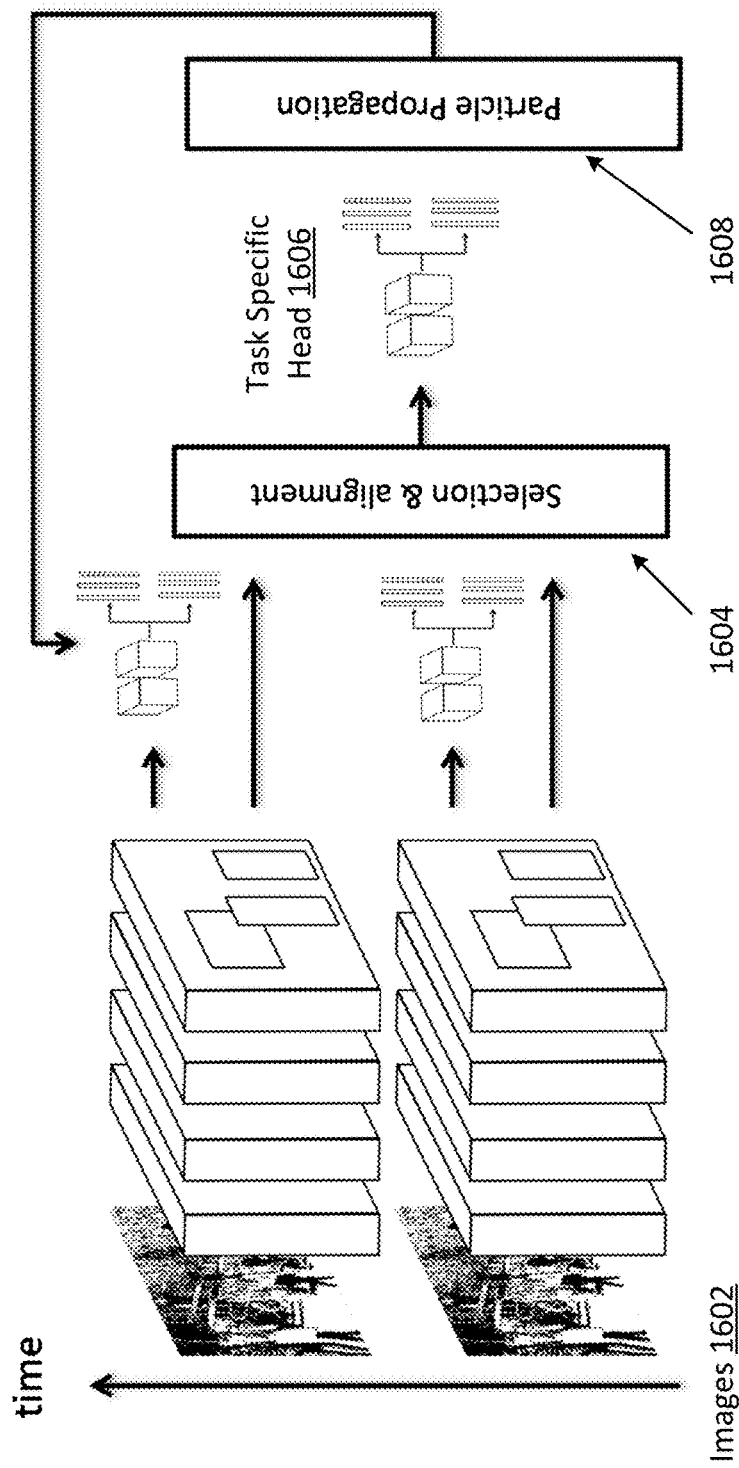
FIG. 16 illustrates an architecture for object classification and tracking according to some embodiments of the invention.

Embodiments of the invention may be used for joint classification and object tracking using local homography. FIG. 16 illustrates an architecture for joint object classification and tracking according to some embodiments of the invention. If combined with object classification and detection, the object can be tracked by forward or backward particle propagation. In FIG. 16, the information of the position of the particles belonging to an object is used to refine the hypothesis of the location of the object in the next image in order to focus the matching performance of the task-specific head 1606. The classification/detection of the obstacle will tell which points belong to whom/what, and the homography is then used to determine the best hypothesis for the object tracking task.

Exemplary embodiments of the invention thus provide many advantages over conventional methods. For example, computation of multiple homography hypotheses may be performed in the feature map instead of being processed on raw image data. The computation of the multiple homography hypotheses may include determining hypothesis flags which indicate reliability of the multiple homography hypotheses. Additionally, a selection mask may be included in the computation of the multiple homography hypotheses. The selection mask indicates a part, a region, or an area for which the calculated multiple homography hypotheses apply. Further, local dense homography may be used to derive particle trajectories using homography composition. Moreover, dense depth map estimation is based on particle propagation. Also, object clustering and tracking is based on local dense homographies.

Figure 17:
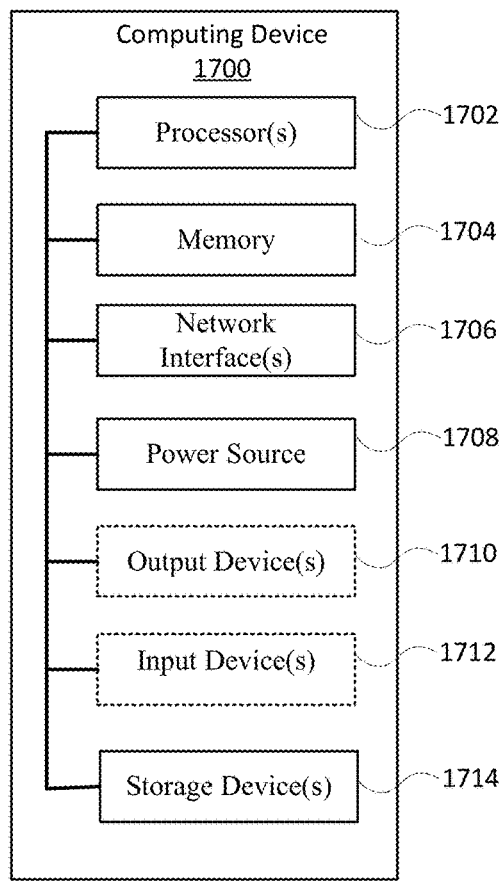
FIG. 17 illustrates components of a computing device according to some embodiments of the invention.

The neural networks and various modules functionally described in the various embodiments of the invention may be implemented on a computing device, for example, a desktop computer, a server, a laptop computer, a microcontroller, a graphics processing unit, and so on. FIG. 17 illustrates components of a computing device 1700 according to some embodiments of the invention. Computing device 1700 may include one or more processors 1702, memory 1704, network interfaces 1706, power source 1708, output devices 1710, input devices 1712, and storage devices 1714. Each component provided is interconnected physically, communicatively, and/or operatively for inter-component communications in order to realize functionality ascribed to one or more computers or devices running a dynamic application according to embodiments of the invention. To simplify the discussion, the singular form will be used for all components identified in FIG. 17 when appropriate, but the use of the singular does not limit the discussion to only one of each component. For example, multiple processors may implement functionality attributed to processor 1702.

Processor 1702 is configured to implement functions and/or process instructions for execution within the computing device 1700. For example, processor 1702 executes instructions stored in memory 1704 or instructions stored on a storage device 1714. In certain embodiments, instructions stored on storage device 1714 are transferred to memory 1704 for execution at processor 1702. Memory 1704, which may be a non-transient, computer-readable storage medium, is configured to store information within the computing device 1700 during operation. In some embodiments, memory 1704 includes a temporary memory that does not retain information stored when the computing device 1700 is turned off. Examples of such temporary memory include volatile memories such as random access memories (RAM), dynamic random access memories (DRAM), and static random access memories (SRAM). Memory 1704 also maintains program instructions for execution by the processor 1702 and serves as a conduit for other storage devices (internal or external) coupled to the computing device 1700 to gain access to processor 1702.

Storage device 1714 includes one or more non-transient computer-readable storage media. Storage device 1714 is provided to store larger amounts of information than memory 1704, and in some instances, configured for long-term storage of information. In some embodiments, the storage device 1714 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 1706 are used to communicate with external devices and/or servers. The computing device 1700 may include multiple network interfaces 506 to facilitate communication via multiple types of networks. Network interfaces 1706 may include network interface cards, such as Ethernet cards, optical transceivers, radio frequency transceivers, or any other type of device that can send and receive information. Non-limiting examples of network interfaces 1706 include radios compatible with several Wi-Fi standards, 3G, 4G, Long-Term Evolution (LTE), Bluetooth®, etc.

Power source 1708 provides power to the computing device 1700. For example, the device 1700 may be battery powered through rechargeable or non-rechargeable batteries utilizing nickel-cadmium or other suitable material. Power source 1708 may include a regulator for regulating power from the power grid in the case of a device plugged into a wall outlet, and in some devices, power source 1708 may utilize energy scavenging of ubiquitous radio frequency (RF) signals to provide power to the computing device 1700.

The computing device 1700 may also be equipped with one or more output devices 1710. Output device 1710 is configured to provide output to a user using tactile, audio, and/or video information. Examples of output device 1710 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user of the computing device 1700.

The computing device 1700 may also be equipped with one or more input devices 1712. Input devices 1712 are configured to receive input from a user or the environment where the device 1700 resides. In certain instances, input devices 1712 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The hardware components described thus far for the computing device 1700 are functionally and communicatively coupled to achieve certain behaviors. In some embodiments, these behaviors are controlled by software running on an operating system of the computing device 1700.

Figure 18:
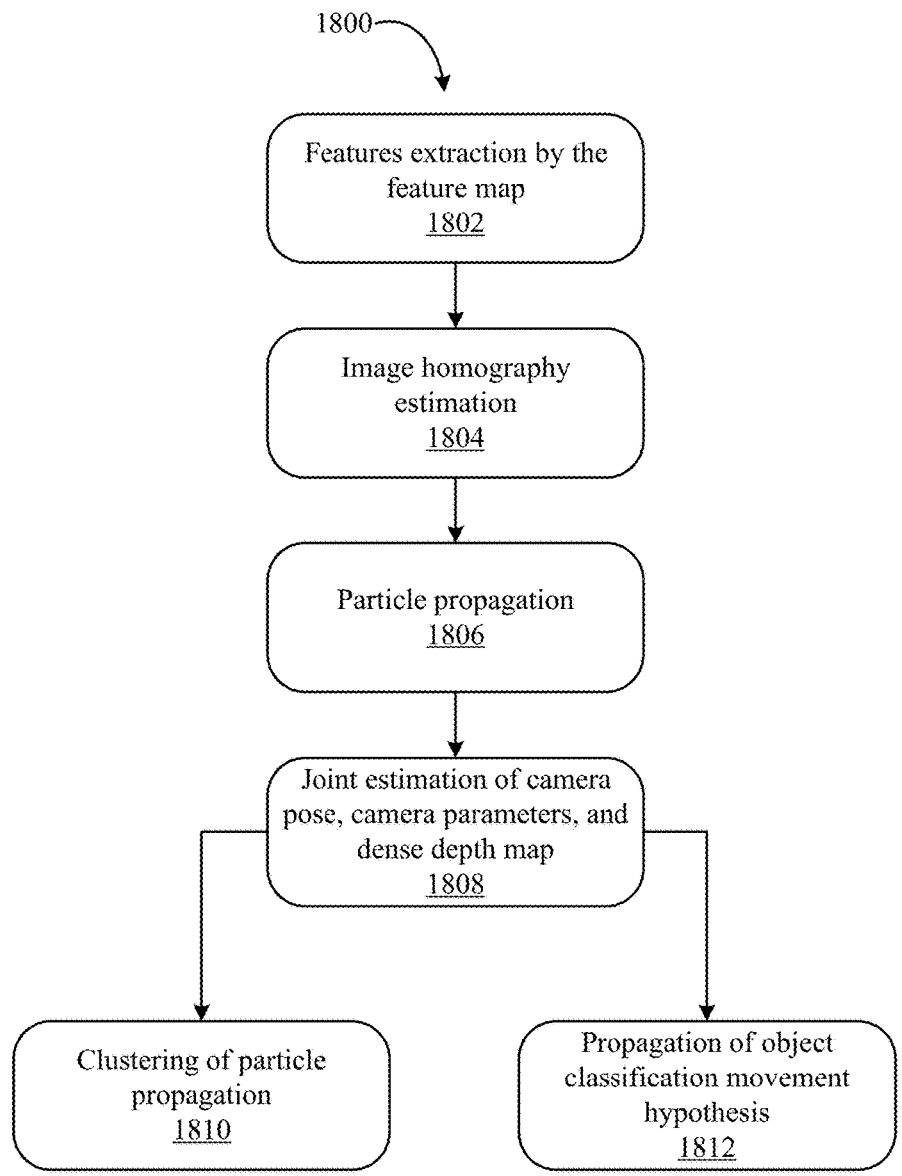
FIG. 18 is a flow diagram illustrating a process for local homography estimation according to some embodiments of the invention.

FIG. 18 is a flow diagram illustrating a process 1800 for local homography estimation according to some embodiments of the invention. The process may be performed by the large scale image processor 204 of FIG. 2 which may include one or more neural networks as described in various embodiments of the invention. At step 1802, the large scale image processor 204 receives one or more images and extracts one or more features from the images. The large scale image processor 204 may include feature maps for extracting features in the images. The feature maps may be implemented by convolution neural networks.

At step 1804, the large scale image processor 204 estimates image homography or fundamental matrix. The large scale image processor 204 may include a task-specific head neural network that takes extracted features from step 1802 from multiple images to derive a local homography as described in FIG. 5. The image homography estimation or fundamental matrix estimation is based on point transformation for different destination patch hypothesis. The image homography or fundamental matrix estimation may include a hypothesis flag and a selection mask.

At step 1806, the large scale image processor 204 determines propagation or trajectories of particles based on composition of the image homography at step 1804. Particles may be defined as image pixel points.

At step 1808, the large scale image processor 204 determines joint estimation of camera pose, camera parameters, and a dense depth map. The trajectory of particles obtained at step 1806 is used along with known camera parameters to determine unknown camera parameters and the dense depth map.

At step 1810, the large scale image processor 204 may cluster particle trajectories for object tracking and detection. By grouping or clustering one or more particles and tracking how the cluster of particles moves, the large scale image processor 204 is able to track movement of an object from one image to another.

At step 1812, the large scale image processor 204 may propagate an object classification movement hypothesis using local homography.

The process depicted in FIG. 18 may, for example, be used to build a digital map of an environment (e.g., in an emergency situation mapping an area where there is a passage to allow for movement in an unknown environment) in connection with a VSLAM module, for example, the VSLAM module 104, of a robot. The output of step 1810 (clustering) can be used to detect movement of object in the scene and to use this information along with the distance (based on the depth map) to let a robot/vehicle avoid the obstacle, for example, by breaking or computing an alternative path. The clustering allows for detection of a new moving object that can then tracked. Step 1810 can also be used, for example, to improve the tracking of objects for example to speed up the computation and allow real-time tracking, with similar use as the previous block. To provide another example, step 1808 (camera pose, camera parameters, dense map) may be used to compute the movement of a camera or robot, to define a distance of the object in the environment, e.g., for obstacle avoidance or mapping the environment.

Embodiments of the invention use CNN for real-time processing of video and performing multiple tasks including homography, dense depth mapping, object tracking, and so on. Feature extraction by the CNN may be outsourced to dedicated hardware, for example, a vector computer, a graphics processing unit, and a field programmable gate array. This allows for large images to be analyzed in real time using data driven learning methods like CNN. Table 1 shows a comparison of various methods of determining homography estimation. Homography estimation using a CNN is contrasted with homography estimation using SIFT and ORB feature detectors on the synthetic data. Feature extraction preprocessing feature map is derived by VGG16 for all three methods.

TABLE 1

| METHOD | Mean Absolute Error (MAE) | Std Dev of MAE | Success Rate |
|---|---|---|---|
| CNN | 7.68 | 14.08 | 100% |
| ORB | 783.80 | 7976.52 | 45% |
| SIFT | 215.78 | 1013.42 | 62% |

The invention provides embodiments for integrated homography estimation and object tracking. Large images may be used as inputs and extracted features may be clustered in time as well as multiple features may be clustered with one another. The use of clustering for feature matching provides an independence of object class such that unlearned features may be identified and tracked. The feature map used for extracting features may be reused for each image, and feature extraction is performed only once.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for image processing performed by a computing device, the method comprising:
   receiving one or more images and preprocessing the one or more images by extracting one or more features from the one or more images;
   estimating image homographies and/or fundamental matrices based on the one or more features extracted from the one or more images;
   determining particle trajectories based on composition of the image homographies and/or fundamental matrices, wherein a particle trajectory comprises image pixel points identified in a subset of the one or more images; and
   determining a joint estimation of camera pose, camera parameters, and a dense depth map using the particle trajectories.

2. The method according to claim 1, further comprising: clustering the particle trajectory for object tracking and object detection.

3. The method according to claim 1, further comprising: propagating an object classification movement hypothesis based on the image homographies and/or fundamental matrices.

4. The method according to claim 1, wherein in the image homographies and/or fundamental matrices, each image homography and/or fundamental matrix comprises a hypothesis flag and/or a selection mask, the hypothesis flag indicating a consistency of the homography and the selection mask indicating one or more parts of the one or more images for which the image homography applies.

5. The method according to claim 4, wherein the hypothesis flag is implemented with a softmax output.

6. The method according to claim 1, wherein the one or more images are preprocessed with a convolutional neural network.

7. The method according to claim 6, wherein the convolutional neural network is a ResNet, a ResNext, an AlexNet, or a VGG16.

8. The method according to claim 6, wherein each image is preprocessed only once.

9. The method according to claim 1, wherein estimating the image homographies and/or fundamental matrices based on the one or more features extracted from the one or more images comprises reconstructing an extracted feature at different scale levels using a feature pyramid network.

10. The method according to claim 1, wherein estimating each image homography and/or fundamental matrix comprises obtaining an image homography and/or a fundamental matrix based on a regression network, wherein a last layer of the regression network has a linear activation function.

11. The method according to claim 10, wherein a loss function for the regression network is a mean square error norm.

12. An image processor comprising:
a convolutional neural network configured to:
receive one or more images, and
preprocess the one or more images by extracting one or more features from the one or more images; and
a task-specific head convolutional neural network configured to:
estimate image homographies and/or fundamental matrices based on the one or more features extracted from the one or more images,
determine particle trajectories based on composition of the image homographies and/or fundamental matrices, wherein a particle trajectory comprises image pixel points identified in a subset of the one or more images, and
determine a joint estimation of camera pose, camera parameters, and a dense depth map using the particle trajectories.

13. The image processor according to claim 12, wherein the task-specific head is further configured to:
cluster the particle trajectories for object tracking and object detection.

14. The image processor according to claim 12, wherein the task-specific head is further configured to:
propagate an object classification movement hypothesis based on the image homographies and/or fundamental matrices.

15. The image processor according to claim 12, wherein each image homography and/or fundamental matrix comprises a hypothesis flag and/or a selection mask, the hypothesis flag indicating a consistency of the homography and/or fundamental matrix and the selection mask indicating one or more parts of the one or more images for which the image homography and/or fundamental matrix applies.

16. A non-transitory computer-readable medium having processor-executable instructions stored thereon, wherein the processor-executable instructions, when executed by an image processor, facilitate:
receiving one or more images and preprocessing the one or more images by extracting one or more features from the one or more images;
estimating image homographies and/or fundamental matrices based on the one or more features extracted from the one or more images;
determining particle trajectories based on composition of the image homographies and/or fundamental matrices, wherein a particle trajectory comprises image pixel points identified in a subset of the one or more images; and
determining a joint estimation of camera pose, camera parameters, and a dense depth map using the particle trajectories.

17. The non-transitory computer-readable according to claim 16, wherein the processor-executable instructions, when executed, further facilitate:
clustering the particle trajectory for object tracking and object detection.

18. The non-transitory computer-readable according to claim 16, wherein the processor-executable instructions, when executed, further facilitate:
propagating an object classification movement hypothesis based on the image homographies and/or fundamental matrices.

19. The non-transitory computer-readable according to claim 16, wherein in the image homographies and/or fundamental matrices, each image homography and/or fundamental matrix comprises a hypothesis flag and/or a selection mask, the hypothesis flag indicating a consistency of the homography and the selection mask indicating one or more parts of the one or more images for which the image homography applies.

* * * * *